(12) United States Patent
Saucedo

(10) Patent No.: US 9,383,122 B2
(45) Date of Patent: Jul. 5, 2016

(54) SPIRAL CONCENTRATING COLLECTOR WITH MOVING RECEIVER

(71) Applicant: Eduardo Saucedo, Raleigh, NC (US)

(72) Inventor: Eduardo Saucedo, Raleigh, NC (US)

( * ) Notice: Subject to any disclaimer, the term of this patent is extended or adjusted under 35 U.S.C. 154(b) by 80 days.

(21) Appl. No.: 14/080,720

(22) Filed: Nov. 14, 2013

(65) Prior Publication Data

US 2015/0128929 A1    May 14, 2015

(51) Int. Cl.
*F24J 2/10*    (2006.01)
*F24J 2/38*    (2014.01)
*F24J 2/04*    (2006.01)

(52) U.S. Cl.
CPC ..... *F24J 2/38* (2013.01); *F24J 2/10* (2013.01); *F24J 2002/0416* (2013.01); *Y02E 10/47* (2013.01)

(58) Field of Classification Search
None
See application file for complete search history.

(56) References Cited

U.S. PATENT DOCUMENTS

| | | | | |
|---|---|---|---|---|
| 2,687,874 A | * | 8/1954 | Newman | 254/134 |
| 3,974,824 A | | 8/1976 | Smith | |
| 3,991,740 A | | 11/1976 | Rabl | |
| 4,071,017 A | * | 1/1978 | Russell et al. | 126/607 |
| 4,132,219 A | | 1/1979 | Cohen et al. | |
| 4,148,564 A | * | 4/1979 | Devin | F24J 2/14 126/573 |
| 4,235,225 A | * | 11/1980 | Doebel | F24J 2/10 126/570 |
| 4,287,880 A | | 9/1981 | Geppert | |
| 4,296,737 A | * | 10/1981 | Silk | F24J 2/07 126/578 |
| 4,355,630 A | * | 10/1982 | Fattor | 136/246 |
| 4,454,371 A | * | 6/1984 | Folino | 136/246 |
| 4,770,162 A | * | 9/1988 | L'Esperance | F24J 2/145 126/570 |
| 6,454,442 B1 | * | 9/2002 | Changaris | F21V 7/0008 362/241 |
| 6,994,082 B2 | * | 2/2006 | Hochberg | F24J 2/145 126/694 |
| 2010/0205963 A1 | * | 8/2010 | Ammar | F24J 2/055 60/641.15 |
| 2010/0206296 A1 | * | 8/2010 | Matalon | F24J 2/0483 126/605 |
| 2011/0100358 A1 | * | 5/2011 | Perisho | F16H 19/005 126/690 |

FOREIGN PATENT DOCUMENTS

| | | | | |
|---|---|---|---|---|
| IT | WO 2008087676 A1 | * | 7/2008 | F24D 11/003 |
| WO | WO 2008087676 A1 | * | 7/2008 | |

* cited by examiner

*Primary Examiner* — Charlie Y Peng

(57) ABSTRACT

The present invention relates to an improved solar energy concentrating system and to a preferred way of moving the receiver, along a curvilinear path above the mirror surface to the optimal location where the instantaneous concentration of reflected rays is the largest. The system comprises a fixed, trough concentrating collector formed with a concave curvature, shaped as a section of an spiral, oriented along the East-West axis, with a movable receiver, inclined facing South and capable of adjusting the angle of inclination periodically, preferably twice a year. The invention overcomes some of the limitations and is capable of capturing more solar energy, on a more constant basis throughout the year and at a lower cost than the preferred, state-of-the-art, trough parabolic concentrating collectors oriented along the North South axis.

4 Claims, 7 Drawing Sheets

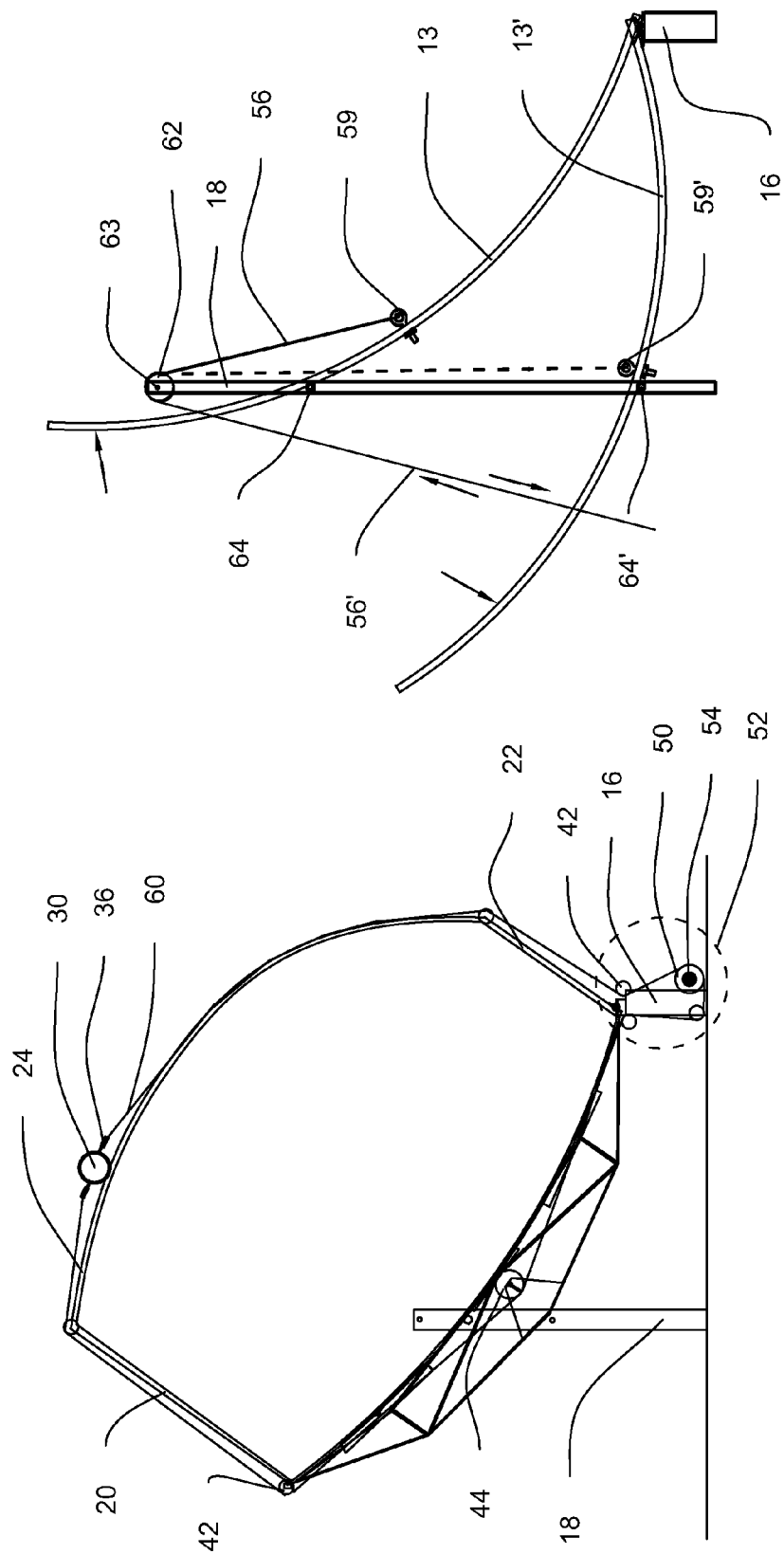

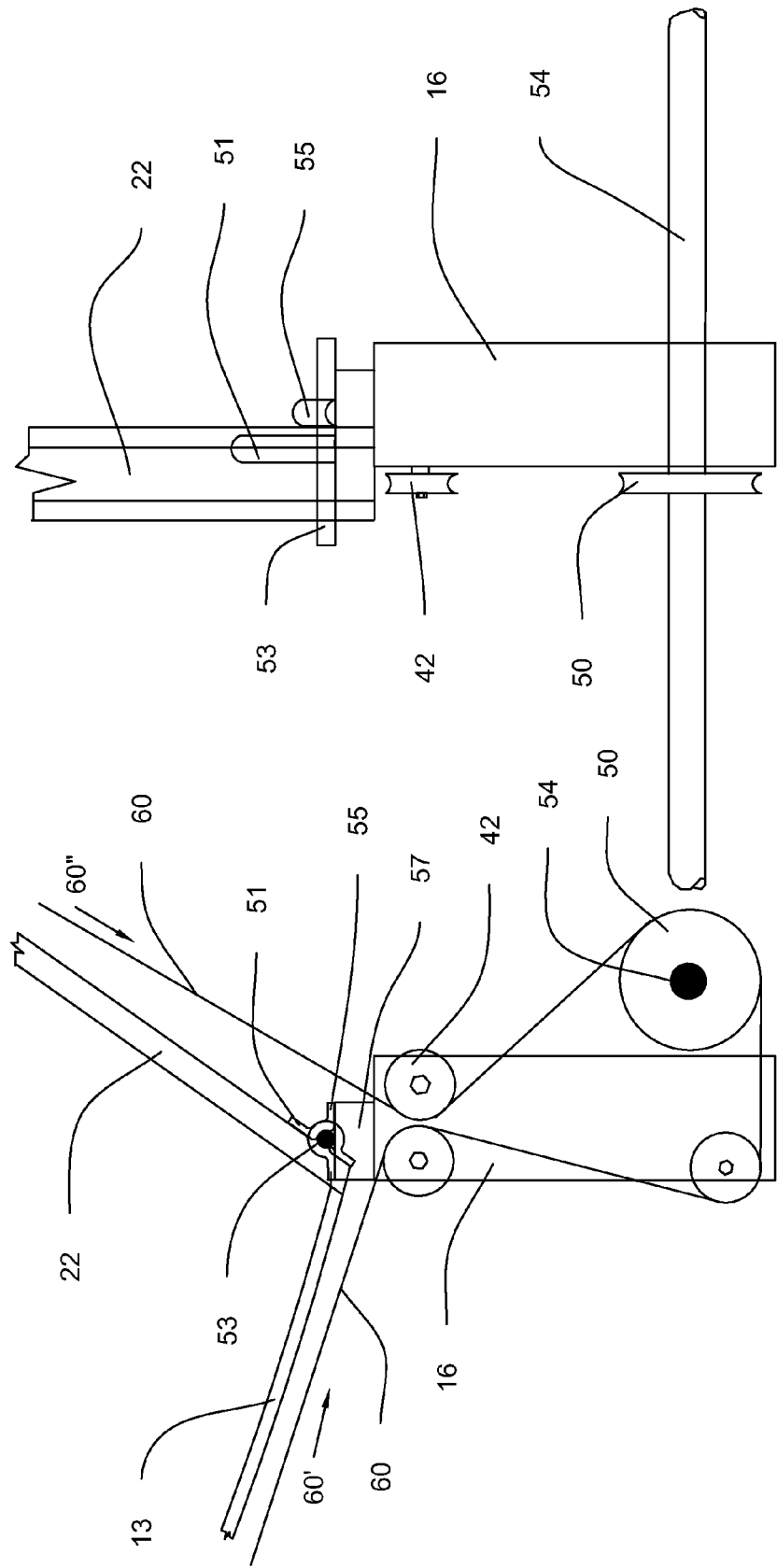

SPIRAL CONCENTRATING COLLECTOR WITH MOVING RECEIVER

BACKGROUND OF THE INVENTION

Solar Energy Generating Systems (herein referred as "SEGS") are electricity producing systems that utilize solar energy as a source heat which coupled with a Rankine engine transform thermal energy into shaft energy which gets transformed into electrical energy. The fluid heated by the sun in a solar collector is used to evaporate a working fluid and the vapor is used to move a turbo-generator by conventional techniques. The spent vapor is condensed utilizing either cold water or air as a heat sink. The turbines of the Rankine engine are a well known and mature technology and latest improvements are relatively small, but there is potential for improvement in the solar collector field which today represents the bulk of the investment of SEGS.

Efforts to capture solar energy to produce steam are more than 150 years old (August Mouchot—1860). Sun-tracking parabolic reflectors are more than 100 years old. Frank Shuman applied for U.S. Pat. No. 1,240,890 in Sep. 30, 1912 for a Sun Boiler that comprises, among other things, a sun tracking parabolic collector. The oil embargo in 1973 spurred research efforts to develop renewable energy sources which translated into a deluge of patents and papers with leap jumps in improvements and installation of photovoltaic panels, wind turbines and solar thermal systems. Several SEGS large plants were installed in the Mojave Desert in the 1980s with a combined capacity of 354 MW.

Recent high energy prices have sparked renewed interest in the use of renewable energy sources. Solar energy, available almost everywhere, is unfortunately much diluted and fluctuates widely during the year and even during the day, even without taking into consideration cloud cover. The installation of wind turbines and photovoltaic has exploded in the last decade and prices have continued to drop, but due to their unsteadiness and unpredictability, without storage, they are not able to provide the steady electricity we need.

The new SEGS with better trough parabolic mirrors and solar towers with dual axis tracking heliostats operating at higher temperatures and with molten salts as thermal storage are able to provide steadier generation and are becoming less pricey. Progress has been impressive and efficiencies have improved steadily over time with better materials, better tracking mechanisms, evacuated tubes, the use of thermal oils and molten salts, or even new approaches like Stirling engines mounted on top of parabolic dual tracking mirrors. Yet, challenges remain State-of-the-art, sun tracking trough parabolic collectors are oriented along the North South ("NS") axis, with the mirror and receiver following the sun's movements from East to West, but are held horizontally even when it is well known that inclining the mirror will allow the capture of more energy. There are two problems with NS orientation: (i) the sun's altitude also changes during the day and seasons (in the winter months in most of the USA, the sun does not rise above the horizon more than 40°, and therefore, collectors oriented along the NS axis face substantial dispersion due to the cosine law in the winter), and; (ii) inclining the collectors to capture more energy is prevented from (a) wind considerations that requires a strong structure to prevent damage to a large moving area; (b) shadowing effects requiring large distances between collectors, and even; (c) possible freeze considerations due to the difficulty of draining low spots of a field of inclined collectors. As of today, no economic solution has been found for the problem of inclining large surface collectors capable of resisting strong winds.

An inclined collector oriented along the East-West ("EW") axis, facing South in the northern hemisphere ameliorates some of the problems discussed above, but encounters others. The hourly movement of the sun produces accentuated daily dispersion and the collectors need to be spaced further apart. While the output of NS collectors peaks during the summer, the output of inclined EW collectors (same angle as latitude) peaks during the spring and fall equinoxes.

Since the electricity generated is mostly sold to utilities, to improve the financial viability of SEGS, developers sought larger solar thermal installations to capture better economies of scale, high temperatures to improve thermal efficiencies and even molten salts to provide some storage, that has resulted in increased size and complexity which makes their financing and proliferation difficult.

The present invention relates to the use of an inclined and flip-able spiral shaped fixed trough collector, oriented along the EW axis with a moving receiver. The system departs from current pursuit of high temperature and large generation units, seeking instead a less costly and simpler smaller scale system, which could be the basis of a distributed system generating with capacities of several hundred kW.

PRIOR ART

There is a plethora of books discussing solar thermal energy and hundreds of patents related to solar collectors. Depending on the application, there are many ways of optimizing the feeble solar resource to achieve the desired goal. In one hand, pool heating requires little temperature gradient and can use inexpensive PVC conduits to reach the goal while on the other hand, solar towers with heliostats achieving concentration ratios of several hundred suns require the use of molten metal as the heat transfer medium.

For this application, the relevant patents to consider are those with fixed mirrors but movable receivers. Fletcher et all (U.S. Pat. No. 4,065,053—Dec. 27, 1977) recommended an East-West orientation for the second stage heating source for a large (100 MW) ground based, fixed cylindrical collector to minimize the receiver's movement which is supported by stanchions, with a pivoted moving arm connected to a bar linkage member where the receiver is fastened, which allows the receiver to move in a circular path above the mirror and with the receiver having a secondary reflector to capture scattered irradiation. Myles et al (U.S. Pat. No. 5,673,684—Oct. 7, 1997) proposed a concave cylindrical configuration mirror with a moving receiver, the receiver being connected to a drive shaft that impinges a circular motion, and with the receiver also coupled with a secondary parabolic reflector and with the collector oriented within 30° of true East-West axis. Finally, Fairstein's recent patent (U.S. Pat. No. 8,474,445—Jul. 2, 2013) provides for a shallow cylindrical trough mirror configured to share structural elements with a building and with a movable receiver within the area of focus of the mirror with a secondary mirror that augments solar energy collection and parallel linear tracking assemblies that move the receiver with a mechanism mounted on the building sidewalls. Either the building is used for other purposes or the mirror is limited by the building size.

While some fixed collectors without moving receivers discuss the possibility of changing the inclination of the collector, none of these collectors in the patents enumerated above provide for the possibility of periodically changing the inclination of the collector.

OBJECTS AND ADVANTAGES

The object of the invention is to design an inexpensive solar collector that can meet the following criteria:

The proposed collector should be capable of heating a reasonable flow rate of water (or another substance chosen as the heating fluid) to not less than 180° C., for a period of not less than six hours a day;

The proposed collector should be capable of capturing a relatively constant amount of heat throughout the year (assuming no cloud cover), with no day capturing less than 75% of the yearly average or not more the 125% of the yearly average;

The proposed collector should have similar overall yearly efficiencies comparable with state of the art sun tracking parabolic collectors, and;

The proposed collector should cost less than the state-of-the-art sun-tracking parabolic collectors.

Meeting the above criteria would result in more efficient means of capturing solar energy, at a lower cost, which places the following requirements on the collector:

To be able to reach such temperature, having a reasonable flow rate through the collector capturing such heat, the concentration ratio should exceed 10× for at least six hours a day.

To maintain such concentration ratio for at least six hours a day, either the collector must track the sun, or the receiver needs to be moved.

To capture a larger flux of the available solar energy, the collector should be inclined, facing South (in the northern hemisphere).

To avoid having to build strong structures and ameliorate the wind effects, the collectors should be oriented along the EW axis, reducing the height of the structure and to further simplify the support structure, the collectors should be stationary, and therefore the receiver should move.

To be able to capture similar amounts of energy throughout the year, a means of flipping the inclination of the collectors at least twice a year is necessary.

SUMMARY OF THE INVENTION

The present invention provides for a practical and economical way of integrating the requirements listed above.

While several curvilinear shapes allow concentrating the solar irradiation, a simple variation of the Archimedes spiral shape retains a stronger ability to concentrate the incoming rays into a particular area. The variation of the spiral is characterized by a pair of parametric equations: (a) $x=A\theta \sin(\theta)$, and; (b) $y=A\theta \cos(\theta)$, where A is a parameter that defines the size of the spiral and $\theta$ is the independent variable that defines the curvature. The curvature of the mirror is defined by the initial and final value of $\theta$ and the size of the mirror depends on the value and dimensions of A.

To achieve high temperatures, high concentration ratios ("CR") are required. The concentration ratios are herein defined as the opening of the mirror divided by the diameter of the receiver as a proxy of the area of the mirror divided by the area of the receiver. Flatter mirrors, constructed with a large initial value of $\theta$ and/or a small increment of $\theta$, achieve consistently higher concentration ratios. Flat mirrors require the receiver to be located further away from the mirror surface and a more accurate moving mechanism, but maintain good concentration ratios throughout wider changes on the incident angle.

The maximum solar azimuth in a given location is given by 90° plus the maximum declination in the summer of 23.45° minus the latitude. From this fact, it follows that a stationary collector oriented along the EW axis will only have to move the receiver less than 80° in Southern California and even less if there is shadowing within the collectors. The orientation and fixed position of the mirror allows inclining it, facing South in the northern hemisphere, to allow closer to normal capture of solar irradiation. The selected shape of the mirror and its geographical location defines the optimal angle of inclination to maximize capture for a particular date.

From the considerations given above, one embodiment of the present invention consists of a fixed trough spiral shaped but relatively flat collector with a moving receiver oriented along the EW axis and inclined facing South. The fixed collectors can be heavier, opening the door to many alternatives, among them a pre-cast concrete body, smoothed or even glassed over; or a glass mirror, with a structure strong enough to maintain the shape and coherence; or a less expensive ceramic mirror with a structure and frame. Either one of these materials would have to be covered with a thin reflective film.

The mirror will be held in place above ground in the lower end by a short thin column-like support, preferably concrete columns, evenly spaced along the length of the line, a couple of meters apart. The higher end could also be supported by taller columns, either concrete or metal. The mirror will be fastened to the support columns by traditional means.

In a second embodiment of the present invention, a means of adjusting the tilt or inclination of the collector, preferably twice a year, is provided. Changing the inclination improves the heat captured throughout the year. While the concrete mirror is likely to be too heavy to be moved, the glass or ceramic mirrors might be moved and fixed to the taller columns by traditional means of securing them in place.

While the device can be scaled up or down depending on the needs, economies of scale indicate that a collector field, perhaps a couple of thousand square meters will be ideal. The collector field could be composed of a plurality of lines of collectors, each line having a length between 50 and 100 m long, with collectors with an opening of about 2 m, separated some 10-15 m to avoid shadowing.

While simplified embodiments of the invention have been enunciated and will be further described in detail below, it will be apparent to those of skill in the art that various modifications and substitutions may be made thereto and that the invention intends to cover all such modifications and substitutions that fall within the scope of the appended claims as might be understood from the foregoing written description.

BRIEF DESCRIPTION OF THE DRAWINGS

The present invention will become more fully understood from the detailed description given herein below and the accompanying drawings which are given by way of illustration only and thus are not limitative of the present invention and wherein:

FIG. 5 shows a schematic front view of the moving mechanism.

FIG. 6 illustrates a detailed front view of the moving mechanism at the lower portion of the collector structure.

FIG. 7 shows a detailed lateral view of the lower portion of the moving mechanism.

FIG. 8 illustrates means of flipping the spiral collector twice a year.

DETAILED DESCRIPTION OF THE PREFERRED EMBODIMENTS

Figure 1:
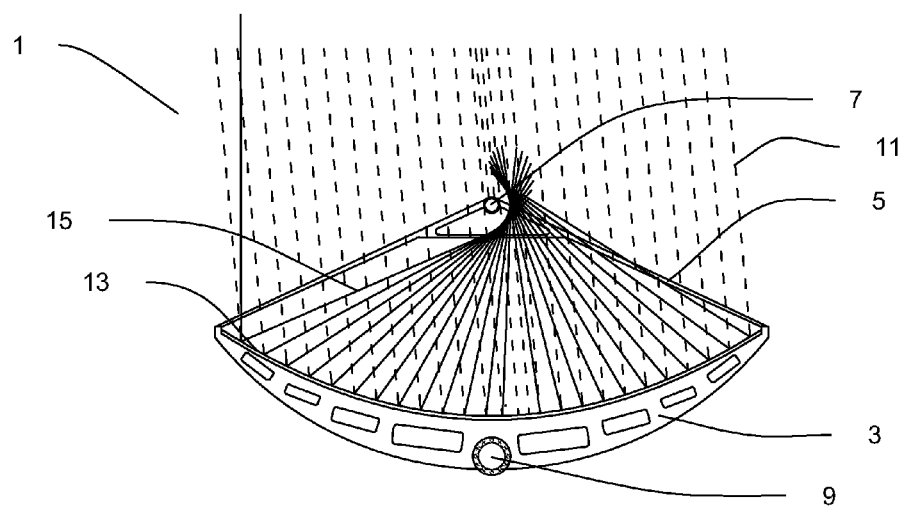
FIG. 1 illustrates a lateral view of a state-of-the-art trough parabolic mirror with incident rays 5 degrees off the axis of the parabola and with the receiver at the focal point of the parabola.

FIG. 1 shows a lateral sketch of a state-of-art parabolic collector 1, depicting a plurality of parallel sun rays 11 coming parallel from the sun's rays inclined 5° from the axis of the parabola. The parabolic collector has a mirror surface 13, a frame 3, two or more struts 5 supporting the receiver 7, which are attached to the frame and an axis 9 with means of rotating the collector along said axis. Each incoming ray impinges the mirror surface 13 at a different point, which has a slightly different slope, therefore forming reflecting rays 15 at a different angle. A parabolic mirror is the preferred trough shape, because in a parabola, if the incoming rays are coming parallel to the axis of the parabola, all rays will be reflected at the focus of the parabola. With accurate sun tracking mechanisms, the parabola can produce good concentration when the collector is oriented along the NS axis, following the sun as it moves from East to West. FIG. 1 shows that parabolic mirrors quickly lose their focusing ability when the rays of the sun are off the axis of the parabola by only 5°. This inability to maintain focus forces the use of a sophisticated and accurate sun tracking mechanism.

Figure 2:
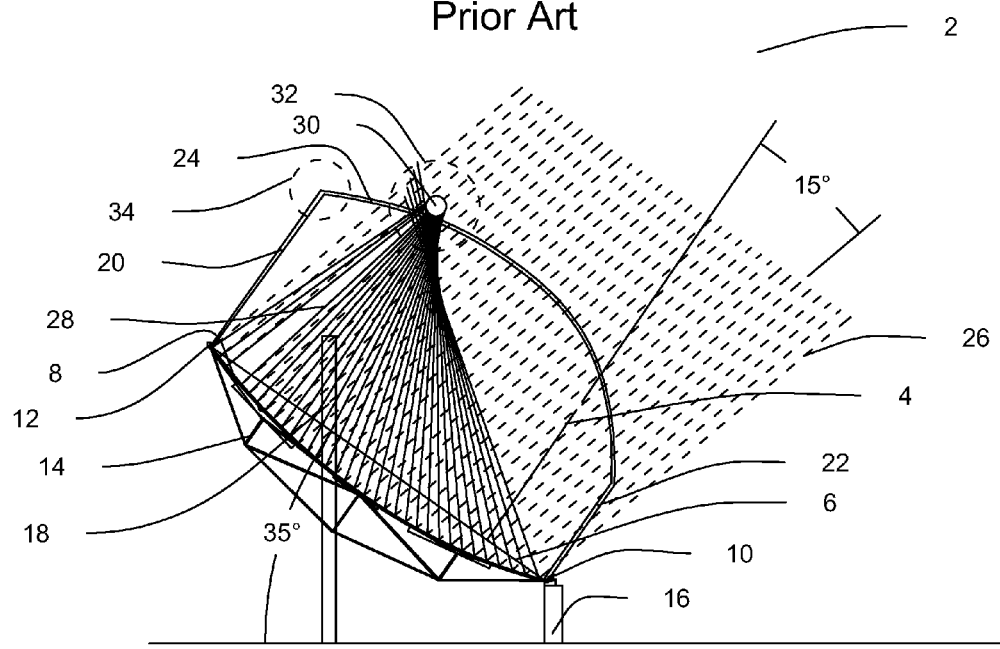
FIG. 2 illustrates a lateral view of a trough spiral mirror with incident rays 15 degrees off a perpendicular line to the line connecting the lips of the mirror, with the mirror inclined 35 degrees and with the receiver moved to the optimal location to capture the largest amount of reflected rays.

FIG. 2 shows a lateral view of an inclined spiral collector 2, at a cut, somewhere in the middle of the longitudinal axis of said collector, next to one of the frames. The view also depicts a plurality of parallel sun rays 26 inclined 15° from line 4 which is perpendicular to line 6 connecting the lower lip 10 of the mirror surface 8 and the upper lip 12. The collector is shown inclined 35°, the angle formed between line 6 and the horizon. The spiral collector also has a plurality of equidistant frames 14, spaced and constructed as needed to provide the needed structural integrity. Other structures described herein below coincide with the location of the frames. While the description is singular, it is understood that each element is replicated on each of the plurality of frames. The frame of the inclined spiral collector is lighter than the frame 3 of the parabolic mirror of FIG. 1, because the frame is stationary and can be fastened to the lower column 16 and the upper column 18 utilizing traditional fastening means. Two struts, the upper strut 20 and the lower strut 22, which are perpendicular to line 6, connect with the receiver rail 24, which guides the solar energy absorber or receiver 30 along a curved path above the mirror surface. The curvature defined by the upper edge of said rail which supports the receiver and the length of the upper strut 20 and lower strut 22 will depend on the dimensions of the mirror and the chosen curvature. The upper strut 20 and the lower strut 22 could be of different length. Each incoming ray 26 impinges the mirror surface 8 at a different point, which has a slightly different slope, therefore forming reflecting rays 28 at a different angle. A good portion of the incoming rays, with an angle of incidence of 15° with respect to line 4, get reflected into the solar energy absorber or receiver 30. Depending on the angle of incidence of the incoming rays and given the curvature of the mirror surface of the spiral collector, a good portion of the incoming rays gets reflected along the path described by the curved receiver rail 24, which serves as a guide to locate the receiver to capture the maximum amount of reflected rays. The receiver moves up and down along the rail, during the day, propelled by traditional means, locating it in the position where the reflected rays tend to congregate at that instant. As the sun moves, the receiver is moved to the new optimal position. The receiver will be surrounded by a glass enclosure (not shown) to minimize the thermal losses of the receiver due to convection. The void between the receiver and the glass could be empty like in a typical evacuated tube, or not, in which case air will be providing the thermal barrier.

Since the mirror does not need to be moved, it can be constructed out of concrete, ceramic, glass or even thin metal sheets, covered with a reflective film. A concrete mirror might be rather inexpensive, but large pieces that require less assembly would have to be thicker and have ribs along the edges to maintain its shape while in transit. Ceramic tiles are inexpensive and can have very smooth surfaces if glassed over, but are usually smaller and would require a support structure. Glass, the preferred alternative today is practical and can easily be made in larger units requiring less site assembly.

The frame and/or structure could be made easily and inexpensively out of steel, brass or aluminum. It can be welded or cast. The strength of the frame and/or structure is only required to provide structural integrity, support to the struts and rail and to withstand surface winds. The structural requirements are less strict than those of a moving mirror, which needs to be stronger to withstand the wind, maintaining the shape and position of mirror.

Figure 3:
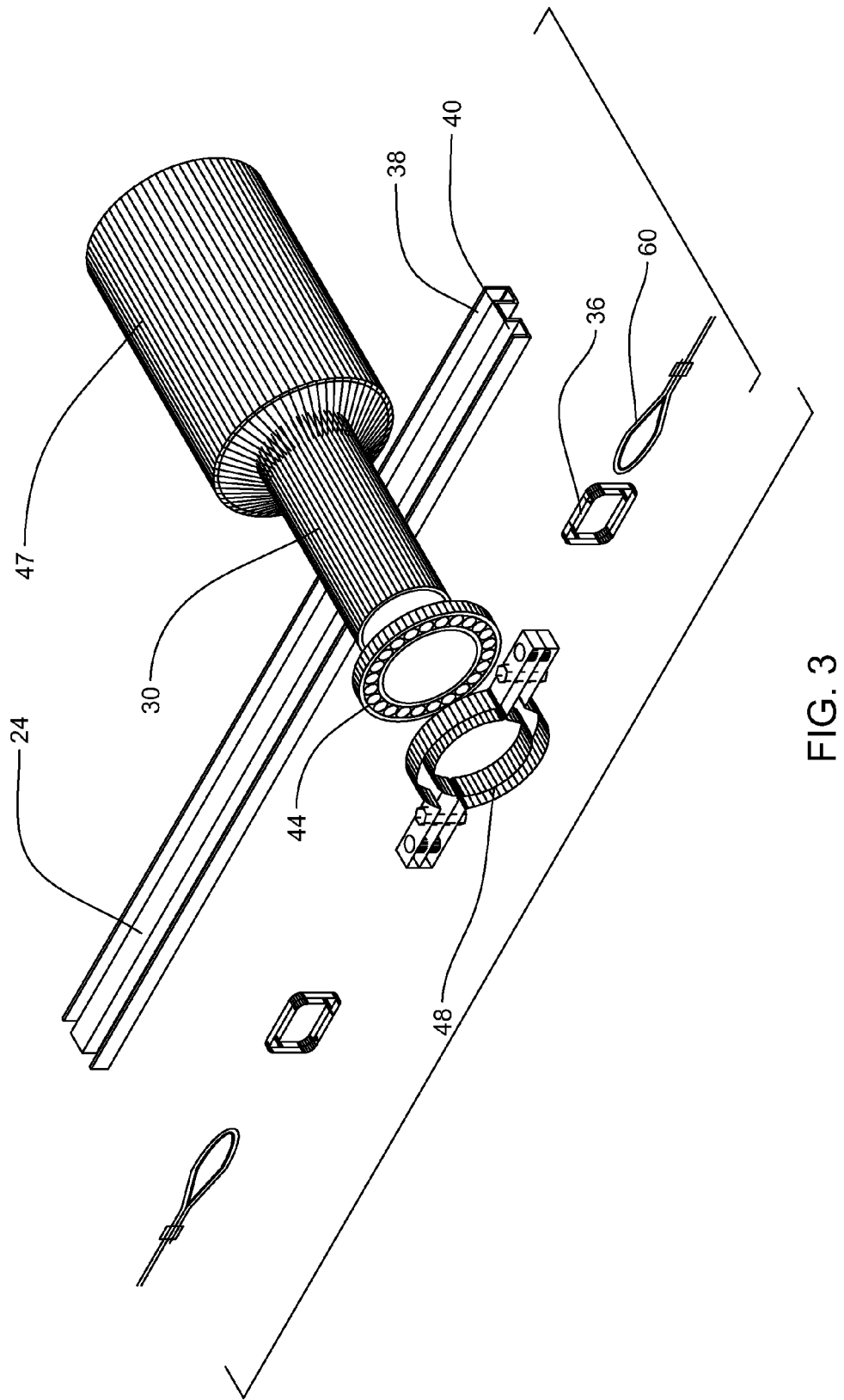
FIG. 3 illustrates an expanded and exploded view of the receiver and details of the fasteners to transmit movement to the receiver.

FIG. 3 shows details of the moving receiver sketched on FIG. 2 along area 32. A small portion of the receiver 30 that is not covered by the glass enclosure 47, receives a brace clamp 48 or other means of clamping the receiver and a ball bearing 44. The brace clamp is connected by a shackle 34 or other means of fastening the brace clamp with the moving wire 60. The receiver rail 24 has at least two different channels providing a path to the ball bearing 38 and the brace clamp 40. The brace clamp channel would also house the tensed moving cable. The receiver, kept tense by the wire, slides across the rail as the wire is pulled in the upward or downward direction by the moving means (not shown). The ball bearing smoothes the movement of the receiver and allows the receiver to freely rotate as it moves along the rail, removing strain and prevents twisting of the flexible connector (not shown) at both ends of the collector. The ball bearing runs in the ball bearing channel and is kept in place in the receiver by conventional spacers (not shown).

Figure 4:
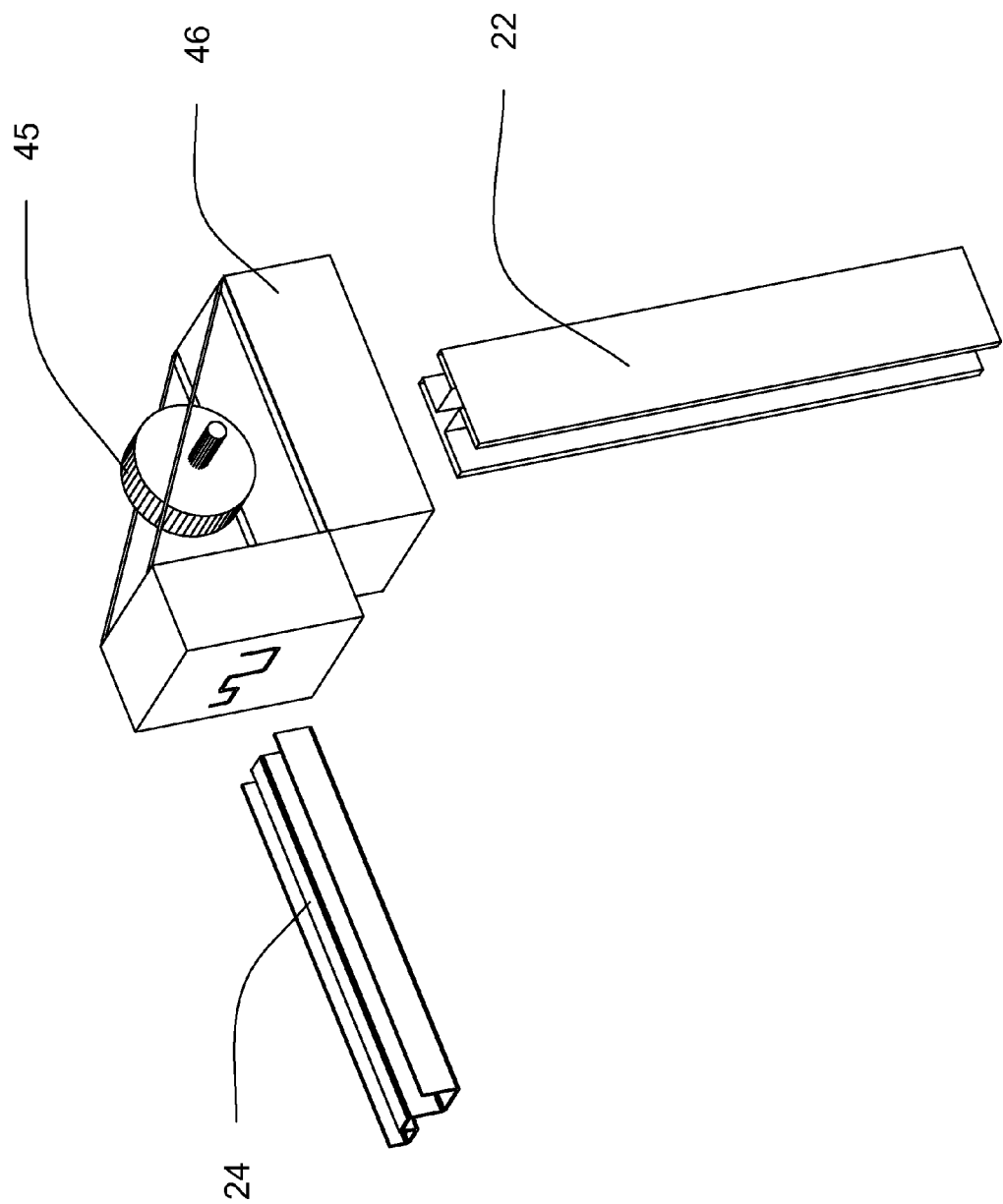
FIG. 4 shows a detailed lateral view of the connection between the rail supporting the receiver and the vertical strut supporting the rail.

FIG. 4 shows details of the connection of the rail with the support structure, along the area 34 of FIG. 2. An aluminum rail fastener 46 or similar fastening means is used to connect the rail 24 with the vertical struts (one for each of the lower strut 22 or the upper strut 20). The cast connector has embedded a free moving pulley 45 to guide the tensed wire 60 (not shown) from changing direction.

FIG. 5 shows a schematic of the receiver's moving mechanism. The moving mechanism follows the movement of a movement transfer pulley 50 that is connected to shaft 54 that moves clockwise or counterclockwise, which translates into moving the receiver 30 up or down along the path or channel on the receiver rail 24. A plurality of free moving pulleys 42 are attached or embedded along the path of the moving wire in all places where a change of direction is required. The moving wire is always kept tensed by means of the tension pulley 44 or other tensioning means.

FIG. 6 shows a front view of details of the movement transmission between the shaft and the moving pulleys along area 52 on FIG. 5. A plurality of freely moving pulleys directs the wire 60 along the desired path to the movement transfer pulley 50 that receives its movement from shaft 54. The wire 60 can be moved up as indicated by 60' or down, as indicated by 60". Fasteners 51 and 55 connect the lower portion of the collector to pin 53, assuring that the mirror is secured in the location and yet has some flexibility to allow it to be flipped sporadically.

FIG. 7 shows a lateral view of FIG. 6, showing alignment between the free moving pulleys 42 and the moving pulley 50 driven by the moving shaft.

FIG. 8 shows a lateral schematic of the flipping mechanism for the collector, presenting the mirror surface 13 and 13' in two different inclinations. Since ideally the collector will have to be flipped only twice a year around spring and fall equinoxes, the flipping mechanism could be rather simple and needs not be attached permanently to the structure. The description assumes that the flipping mechanism is not attached permanently. When the collector is to be moved, a wire 56 or 56", depending on the location of the mirror, is attached to fastener 59 which is placed on a preparation in the mirror and/or mirror frame (not shown). A free moving pulley 62 is attached to pin 63 that is held in a preparation made on the upper support column 18. The continuation of wire 56' is attached to a winch or other means of pulling the wire. A slight pull on the wire frees the support pin 64 from its location in the upper support column allowing the mirror to be flipped from one position to the other. Once the mirror is in the new position, the mirror is fastened to the support pin that is inserted into the new position.

Figure 9:
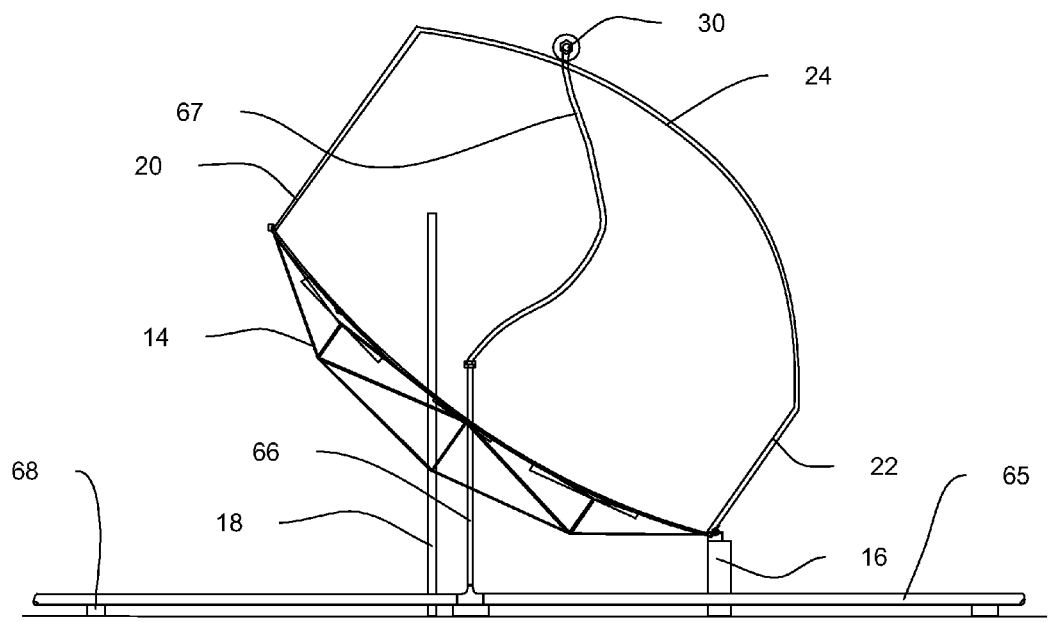
FIG. 9 shows a front view of one extreme of the collector, showing the flexible connector connecting the moving receiver to a manifold.

FIG. 9 shows another lateral view of the collector, at one of the extremes of the collector, showing a flexible connector 67 connecting the receiver 30 with the distribution pipe 66 that is connected to the manifold 65, which is supported above ground by a plurality of supports 68.

Figure 10:
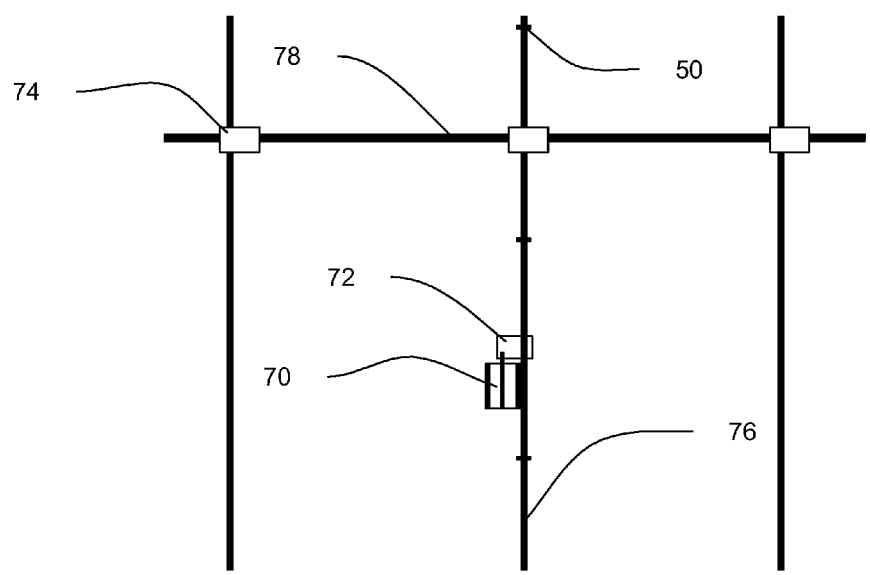
FIG. 10 illustrates the means of transferring the movement to a plurality of mirrors in the collector field along the longitudinal axis and to other lines of collectors.

FIG. 10 shows the means of transferring the movement transfer force along the longitudinal length of the collector, by having a plurality of moving pulleys 50 along the longitudinal shaft 76, each moving pulley coincident to the support columns (not shown) where the movement is transmitted to the receiver with a plurality of moving mechanisms as shown in the previous FIGS. 5 and 6. A sun tracking mechanism known by those familiar with the art (not shown) controls the clockwise or counterclockwise movement of the electric motor 70, which via a gearbox 72 transmits the movement to the longitudinal shaft 76. The longitudinal shaft 76 also transmits the movement to a plurality of gearboxes 74 to transmit the movement to a plurality of lateral shafts 78, which in turn move other gearboxes 74 which move the plurality of longitudinal shafts 76, assuring that all receivers in the collector's field move simultaneously to the desired position dictated by the sun tracking mechanism.

It will be apparent to those of skill in the art that various modifications and substitutions may be made thereto and that the invention intends to cover all such modifications and substitution that fall within the scope of the invention.

In one embodiment of the present invention, chosen among many possibilities, is a 200 cm mirror constructed with an initial angle $\theta$ of 80° and a $\Delta\theta$ of 30° and a receiver of 10 cm in diameter. Such collector would have a CR of 20× with rays perpendicular to the mirror and could have a CR of 12× if the incident angle of the rays is ±30° from the perpendicular, provided that the receiver is moved to the new location where the maximum concentration of rays forms, and a CR of 5× if the incident angle is between −40 to +50° from the perpendicular (the spiral mirror is not symmetric). For such embodiment, the receiver will move along a curve that is about 1 m above the upper lip, about 0.8 m above the lower lip, with a maximum distance above the surface of the mirror, of about 1.45 m. The instantaneous location of the receiver is defined as the point that maximizes the capture of the reflected rays with the ever changing incident angles.

Figure 11:
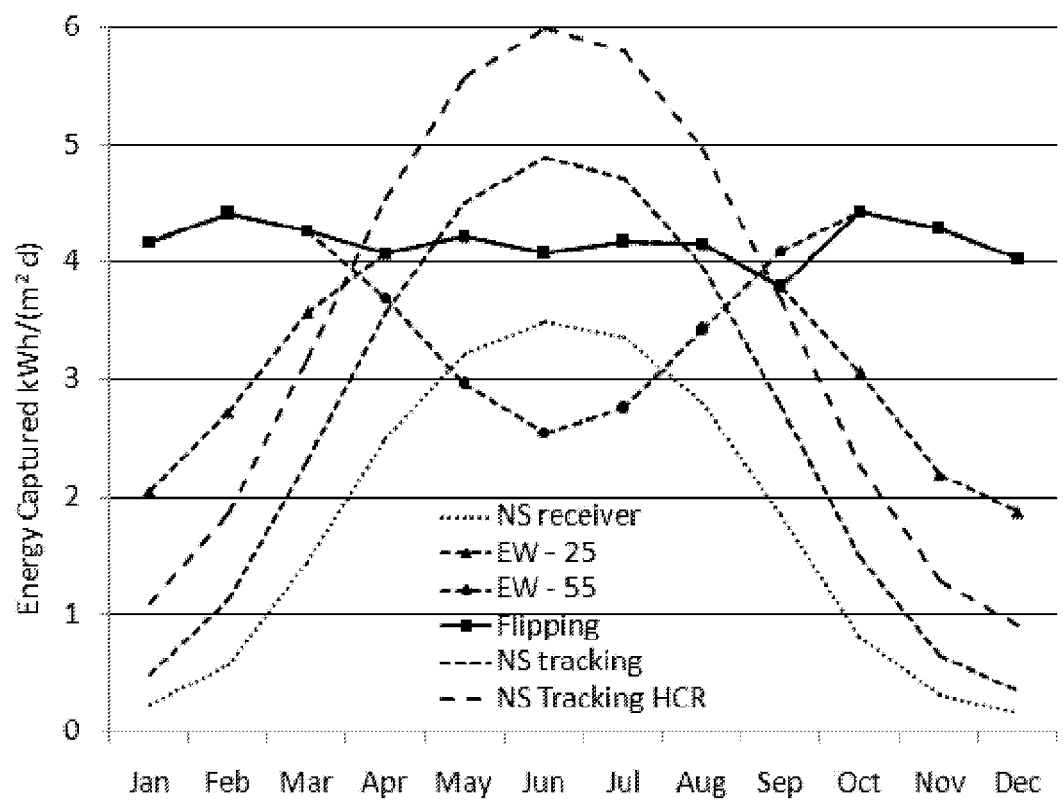
FIG. 11 compares the amount of heat captured annually by several collectors.

Finally, FIG. 11 shows the potential heat capture (expressed as $kWh/(m^2 d)$ for the embodiment described above on the fifteenth day of every month, for several inclinations and orientations, and compares the possible heat capture with a state-of-the-art, sun tracking parabolic collector. The collector is assumed to be located in Raleigh N.C. (35° 52'N and 72° 12' W) and assumes no cloud cover on that day. While the numerical value of the yearly average presented might be unrealistic because it also assumes no cloud cover, the comparison of the relative potential heat capture is still valid.

The graph shows six curves. The first three curves follow current practices as the collectors are oriented along the North South axis and the mirrors are held horizontally. The first curve, labeled NS receiver, shows the potential heat capture of the spiral mirror described above, showing very little heat capture during the winter and peaking at about 3.5 $kWh/(m^2 d)$ on June 15. The calculated yearly average is 1.73 $kWh/(m^2 d)$. The second curve, labeled NS tracking assumes the use of a parabolic collector capable of achieving a 20×CR constantly. Heat capture improves substantially and peak capture in June reaches about 4.9 $kWh/(m^2 d)$. The calculated yearly average is 2.56 $kWh/(m^2 d)$. The third curve, labeled NS tracking HCR, assumes a state-of-the-art sun tracking parabolic collector, capable of maintaining 60×CR. Heat capture also improves, and peak collection reaches about 6.0 $kWh/(m^2 d)$. The calculated yearly average is 3.42 $kWh/(m^2 d)$.

The second set of curves has the collectors oriented along the East West axis, with the collectors inclined and facing South. The curve labeled EW-25 assumes that the collector is inclined 25° with respect to the horizon and shows it can capture about 2.0 $kWh/(m^2 d)$ in the winter months and levels up to about 4.2 $kWh/(m^2 d)$ in the summer. The calculated yearly average is 3.32 $KWH/(m^2 d)$. The curve labeled EW-55 assumes that the collector is inclined 55° with respect to the horizon, and shows that it can capture substantially more heat in the winter months, about 4.1 $kWh/(m^2 d)$, but has a very poor capture in the summer, reaching only about 2.50 $kWh/(m^2 d)$ in June 15. The calculated yearly average is 3.75 $kWh/(m^2 d)$. The third curve, labeled Flipping is superimposed in the previous two lines, and assumes that the collector is inclined, facing South, 55° with respect to the horizon from September 15 to March 15, therefore capturing about 4.3 $kWh/(m^2 d)$ during that period, and that it is inclined 25° facing South from March 15 to September 15, capturing also about 4.0 $kWh/(m^2 d)$ in the summer months. Overall, the flipping collector captures on a yearly average about 4.17 $kWh/(m^2 d)$. The heat capture of the Flipping collector is rather even, exceeding the initial requirements of fluctuations above the average. The calculated range, again assuming no clouds, is ±10%.

LIST OF ITEMS ON FIGURES

FIG. 1 State of the Art Sun-tracking Parabolic Collector
1. Parabolic Collector (prior art)

3. Frame
5. Struts
7. Receiver
9. Axis
11. Incoming sun rays
13. Mirror Surface
15. Reflecting Rays
   FIG. 2 Spiral Shaped Collectors
2. Spiral Collector with moving receiver
4. Line perpendicular to line 6
6. Line connecting lips of mirror
8. Mirror surface
10. Lower mirror lip
12 Upper mirror lip
14. Frame
16. Lower support column
18. Upper support column
20. Upper strut
22. Lower strut
24. Receiver Rail
26. Incoming sun rays
28. Reflecting rays
30. Receiver
32. Area for details of receiver
34. Area for detail of moving mechanism
   FIG. 3 Details of Receiver
24. Receiver rail
32. Exploded views area of receiver
36. Receiver. Shackle
38. Ball bearing channel
40 Brace clamp channel
60. Moving Cable
44. Ball bearing
47. Glass enclosure of receiver
48. Brace clamp
   FIG. 4. Details of Rail Fastener
24. Receiver Rai
22. Lower struts
45. Wire transfer pulley
46. Rail Fastener
   FIG. 5 Moving mechanism
16. Lower support column
18. Upper support column
20. Lower Strut
22. Upper Strut
24. Receiver Rail
30. Receiver
36. Receiver Shackle
42. Moving Pulleys
44. Tension Pulley
   Movement Transfer Pulley
52. Exploded area for moving mechanism lower arrangement
54. Moving shaft
60. Moving cable
   FIG. 6. Front Details of Moving Mechanism Lower Arrangement
51. Strut flippable fastener
53. Flippable pin
55. Mirror flippable fastener
57. Support Block
60. Moving cable
60'. Movement of the moving cable up
60". Movement of the moving cable down
   FIG. 7. Lateral Details of Moving Mechanism Lower Arrangement
   FIG. 8. Ripping Mechanism
13'. Mirror in lower position
56. Flipping cable
56'. Movement of flipping cable
56". Flipping cable to lower position
59. Fastener to mirror
59'. Fastener to mirror in lower position
62. Flipping pulley
63. Pin for flipping cable
64. Mirror support pin
64'. Mirror support pin lower position
   FIG. 9. Flexible Connector
65. Manifold
66. Distributor pipe
67. Flexible Connector
68. Ground Manifold Support
   FIG. 10. Moving Mechanism Transfer
70. Electric motor
72. Speed Reducing gearbox
74. Angular transferring gearbox
76. Longitudinal Shaft
78. Lateral Shaft
50. Movement Transfer Pulleys
   FIG. 11. Heat Capture Comparison

What is claimed:

1. A solar energy concentrating system comprising:
   a) at least one fixed, linear trough solar energy concentrating reflector having a reflective surface with a curvature defined by a segment of a spiral of the Archimedes type;
   b) said reflective surface being supported by a frame shaping the solar energy concentrating reflector;
   c) said frame being supported by a mechanism, spaced as required along the longitudinal axis of said solar energy concentrating reflector, such mechanism permitting the inclination of the frame to be modified periodically, preferably twice a year on dates within days of the spring and fall equinoxes, placing the concentrating reflector at such angle that will force the summer and winter sun, respectively, to cross a perpendicular line connecting the two extremes of the concentrating reflector, allowing the concentrating reflector to capture: (i) a substantially homogeneous amount of solar energy throughout the year, and; (ii) as a consequence, collect a higher yearly average amount of solar energy than other state of the art concentrating reflectors;
   d) each solar energy concentrating reflector having a movable solar energy receiver, a conduit through which an energy transfer fluid circulates, said solar energy receiver running parallel to the longitudinal axis and extending the full length of the solar energy concentrating reflector;
   e) each solar energy concentrating reflector having a plurality of rails supporting the solar energy receiver above the upper edge of said rail, over and above the solar energy concentrating reflector, said plurality of rails being disposed perpendicularly to the longitudinal axis of the solar energy concentrating reflector and fastened to a rail support structure that is attached to the frame shaping the solar energy concentrating reflector, said plurality of rails having a predetermined curvature defined by locations of the optimal areas where the reflected rays form the solar energy concentrating reflector will concentrate as the angle of incidence of the sun over said solar energy concentrating collector changes continuously, and;
   f) a microprocessor that periodically calculates the optimal position of the receiver and transmits moving instructions to an electric motor to change the position of the receiver between the extremes of the upper edge of said rail as the sun moves.

2. The solar energy concentrating reflector of claim 1 is made from materials selected from a list that includes concrete, ceramic, glass, metals, plastic or thin sheets of metals, with the inward surface covered with commercially available thin film of highly reflective material.

3. The rail support structure of the solar energy concentrating reflector of claim 1 is spaced along the longitudinal axis of the solar energy concentrating reflector and is dimensioned as structurally required to provide the needed support for the solar energy receiver and placed coincidentally with the structure supporting the solar energy concentrating reflector.

4. The solar energy receiver of claim 1, wherein said solar energy receiver is connected to flexible connectors at both ends of the longitudinal axis, allowing the movement of said receiver.

\* \* \* \* \*